United States Patent
Coes, Jr.

[15] 3,660,949
[45] May 9, 1972

[54] WORK HOLDER FOR IRREGULAR SHAPED WORKPIECES

[72] Inventor: Loring Coes, Jr., Princeton, Mass.
[73] Assignee: Norton Company, Worcester, Mass.
[22] Filed: Apr. 20, 1970
[21] Appl. No.: 29,830

[52] U.S. Cl. ..............................51/216 R, 164/76, 269/7, 269/8, 279/1 M, 335/285
[51] Int. Cl. ..................................B24b 41/06, B25b 11/00
[58] Field of Search....................18/DIG. 33; 51/7, 216, 277; 269/7, 8; 279/1 M; 335/285; 164/70, 76, 262, 264, 270

[56] References Cited

UNITED STATES PATENTS 2,770,823  11/1956  Kamborian..........................269/8 UX
3,341,365  9/1967  Berz.........................................134/25

OTHER PUBLICATIONS

Machinery, Oct. 1946, "Work Holding Methods Used In Surface Grinding" p. 160–166.

Primary Examiner—Theron E. Condon
Assistant Examiner—Neil Abrams
Attorney—Walter Fred

[57] ABSTRACT

A magnetic chuck having a fluidizable bed of ferromagnetic particles, energizable magnets to magnetize the particles, means to fluidize and demagnetize the particles, and to defluidize and magnetize the particles. Irregularly shaped ferrous and non-ferrous foundry castings are easily partially embedded during fluidizing and demagnetizing of the bed and rigidly held in position upon defluidizing and magnetizing of the particles into a rigid mass about the casting. Thereby all portions of the casting can be worked upon by faster cutting and more powerfully fed cutting tools.

13 Claims, 3 Drawing Figures

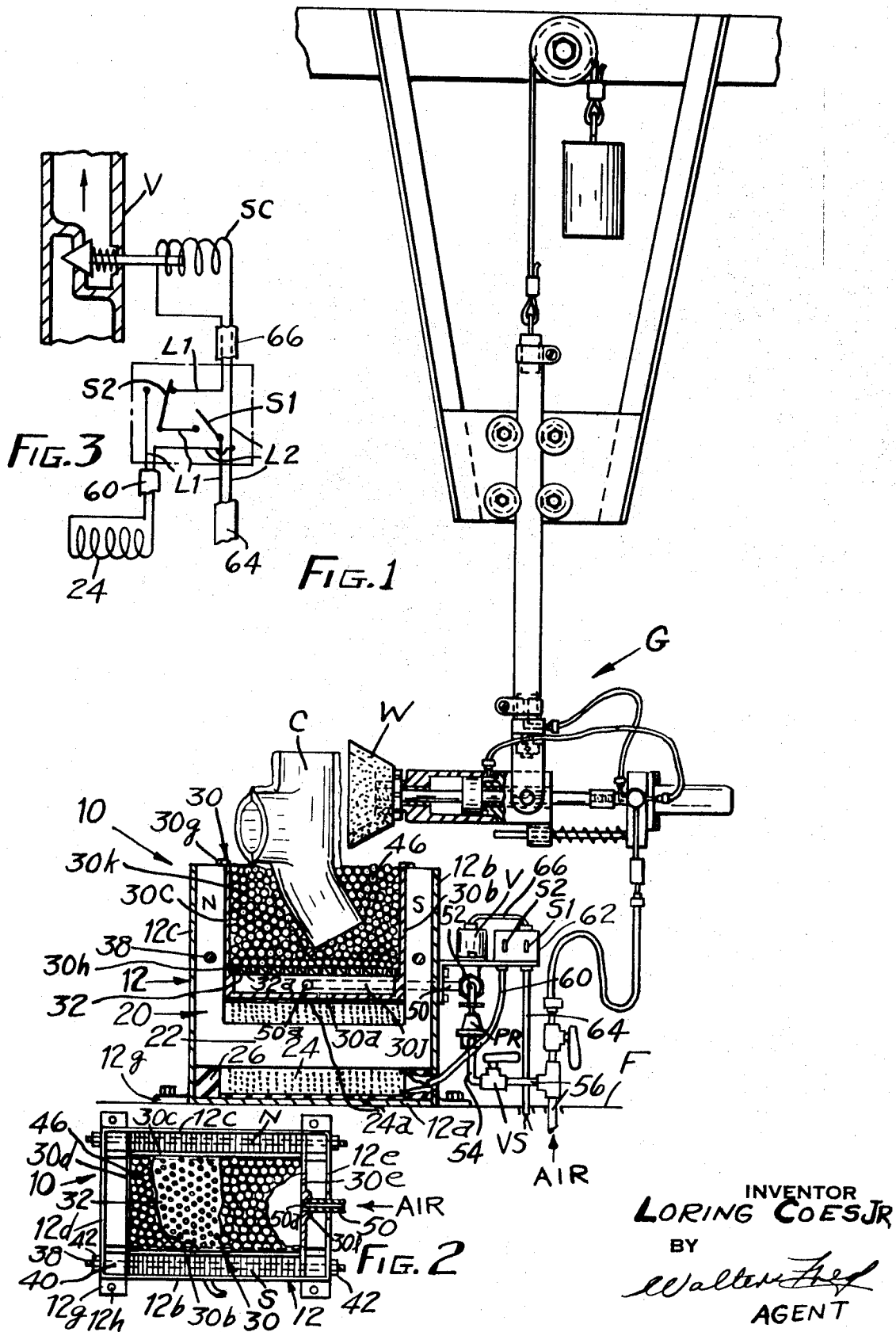

WORK HOLDER FOR IRREGULAR SHAPED WORKPIECES

BACKGROUND OF THE INVENTION

1. Field of Invention

The invention relates to work holders and particularly to a magnetic chuck having a clean fluidizable bed of ferromagnetic particles into which rough castings of various sizes and odd shapes are easily embedded, reoriented and rigidly held so that undesirable material such as sprues, flash, fins, gates, and risers can be removed therefrom at a faster rate by more powerfully fed cutting tools.

2. Description of the Prior Art

In the past magnetic chucks have been used to hold magnetic as well as non-magnetic workpieces of regular, irregular, and awkward shapes. However, the non-magnetic, irregular, and awkwardly shaped workpieces had to be supported and prevented from moving relative to the chucks by blocks or special shaped pieces made of magnetic material held by the magnetized chuck. Also, it is known to pile cast-iron chips on a magnetic chuck after which, a workpiece of complicated shaped is tamped down firmly in and held by the pile of magnetized chips. Thereafter, a precision grinding operation was performed on a top level surface thereof. The above methods and others are disclosed in an article entitled "Work-Holding Methods Used in Surface Grinding" which begins on page 160 of the October 1946 issue of "Machinery" magazine.

All of the methods and apparatus disclosed in the above mentioned articles relate to precision machining done in relatively clean machine shops while the applicant's invention is directed more towards rough cutting, grinding, and snagging off material from castings, done in a relatively dirty foundry cleaning room. The cost of snagging off a pound metal in the foundry is much higher compared to the cost of snagging billets in a steel mill. This difference in cost for two nearly similar operations arises almost wholly from the difficulty in handling, positioning, and holding odd shaped castings which must be reoriented several times during the snagging process. As a consequence most of the snagging is done by grinding wheels or other cutting-tools into which castings are pushed by hand pressure alone. In some cases the hand pressure may be argumented by the use of pressure bars or fluid pressure cylinders which are applicable to grind only a particular area of the casting. This means that on almost all castings some cutting must be done using hand pressure alone. Because of the application of light hand pressures, softer grinding wheels must be used and even the softest wheel must be dressed periodically to maintain a reasonable metal removal rate.

The applicant's invention allows the foundries to automate, attract more workers to the foundry industry, increase its production, lower its cost, and to remove metal at a faster rate then heretofore possible. For example, unsegregated castings of various sizes and shapes can be placed on conveyors going to and from the cutting stations and each casting completely finished at a single station; the cutting tool can be forced against all areas of the workpiece at higher pressures, by more efficiently powered machines; harder and stronger grinding wheels can be used; dressing of the harder and stronger grinding wheel is eliminated; and operator fatigue is greatly reduced which is an important factor in recruiting of foundry workers who might otherwise refuse a strenuous occupation.

One feature of the applicant's invention is closely related to the use of a pile of cast-iron chips disclosed in the above mentioned article. However, another important feature used in combination therewith is that the applicant's invention has means to fluidize the bed of ferromagnetic particles. Fluidizing the bed serves two purposes. One is to keep the bed clean and prevent dirt and swarf from filling the spaced between the particles and reducing the magnetic permeability of the chuck. The other purpose is that the castings can be quickly and easily partially imbedded and reoriented in the fluidized mobile mass of demagnetized ferromagnetic particles.

Magnetic chucks with magnetizable particles have been used in the molding art for the purpose of making casts of human feet and inner molds for shoes which art is nonanalogous to the art to which the applicant's invention pertains. In U.S. Pat. No. 2,138,978 and No. 2,581,489 is disclosed a bed of magnetizable particles for preserving the impression of objects such as human feet for the purpose of making conforming molds and casts thereof. However, unlike the applicant's invention means are not provided for fluidizing the bed of particles.

SUMMARY OF THE INVENTION

A container has an upper chamber with a bed of ferromagnetic particles therein and a lower fluid chamber separated by a porous plate through which a fluidizing medium is passed from a conduit connected to the lower chamber. The container and ferromagnetic particles are situated between poles of opposite polarity and in the magnetic field of an electromagnet adapted to be fixed to a base relative to a power fed cutting tool of a machine. Control means, in one position, deenergizes the electro-magnet and fluidizes the bed of ferromagnetic particles so a workpiece can be partially embedded in the now mobile and fluidized bed of ferromagnetic particles. The control means is easily shifted to another position which cuts off the fluid and energizes the electro-magnet to defluidize and magnetize the bed of ferromagnetic particles into an immobile rigid mass supporting the workpiece to be worked upon by the cutting tool.

BRIEF DESCRIPTION OF THE DRAWING

FIG. 1 is a partial sectional view in elevation of the magnetic chuck and associated controls of the invention supporting an odd shaped casting adjacent the grinding wheel of a power fed snagging grinder;

FIG. 2 is a plan view, on a reduced scale of the magnetic chuck, partly broken away to show the porous plate, the fluid chamber and an inlet thereto; and FIG. 3 is a wiring diagram of the electrical control means for the magnetic chuck of the instant invention.

DESCRIPTION OF THE PREFERRED EMBODIMENT(S)

Referring to the drawings wherein there is shown the magnetic chuck 10 of the instant invention rigidly fixed to a base or floor F and supporting an odd shaped casting or workpiece C adjacent to a versatile snagging grinder G which is more fully disclosed and claimed in a co-pending application. As shown the snagging grinder G is adapted to be manipulated and held by an operator and to rotatably support, rotate, and fluid pressure feed a grinding wheel W axially against the exposed portion of the casting C. In addition the grinder G and the grinding wheel W can be pivoted about both horizontal and vertical axis and raised and lowered relative to the casting C and the magnetic chuck 10. The grinder G is provided with a normally rigid support cable which can be made flexible. However, the magnetic chuck 10 may be used to hold workpieces to be worked upon by other types of hands and power fed machines such as, cut-off machines, swing frame grinder, portable grinders, and machines employing various types of cutting tools other than grinding wheels. Obviously the magnetic chuck 10 may be made in various strength sizes, and geometric configurations. In this instance the magnetic chuck 10 is of rectangular shape and comprises an outer rectangular box or container 12 having a bottom side 12a, and four sidewalls 12b, 12c, 12d and 12e extending upwardly from the bottom 12a. Extending out from the opposite sidewalls 12b and 12c at the bottom of the container 12 are a plurality of fastening plates 12g with holes 12h through them. The plates 12g may be made as part of the peripheral sidewall and bent out or separate pieces suitably fixed thereto as by welding. Suitable fasteners such as bolts or screw 14 are used to fix the container 12 and hence the magnetic chuck 10 rigidly to the base or floor F. Preferably, the container is made of non-magnetic material such as the non-ferrous metals aluminum, brass, copper, etc. The container may be also made of any suitable plastic material, such as hard rubber, styrene proporelyene, Bakelite nylon Teflon which does not disturb the magnetic field.

A large electro-magnet 20 comprising a U-shaped magnetic core or yoke 22 connecting upwardly extending opposed N and S pole pieces. Preferably the U-shaped yoke 22 is conventionally made by laminating a plurality of flat U-shaped plates of magnetic and non-magnetic materials. The non-magnetic plates are placed in between and sparate the magnetic plates in the well known manner. A high silicon content transformer iron is preferred for making the magnetic U-shaped plates.

Wound around the core or yoke 22 is a coil of wire 24 comprising a plurality of turns of a continuous strand of electrically insulated wire through which an electrical current is passed to energize the electro-magnet 20. The exterior of the coil 24 is also coated or covered with a layer 24a of electrical insulation and rests against the bottom side 12a of the container 12. An elongated support strip 26 made of electrical insulating and non-magnetic material is, placed at each side of the coil, between the yoke 22 and the bottom 12a. The strips 26 supports the core or yoke 22.

Within the U-shaped magnet 20 is a second or inner rectangular box or container 30 preferably made of non-magnetic material, extending downwardly between the poles N and S. The container 30 has an open top side opposite a bottom side 30a adjacent insulating layer 24a of the coil 24 and an upwardly extending peripheral sidewall having four integral side walls 30b, 30c, 30d and 30e. At the top of each sidewall 30b and 30c is a projection or lip 30g bent outwardly to engage the top surfaces of the N and S poles of the yoke or core 22. The inner container 30 is thereby rigidly supported by the yoke 22 the supporting strips 26, the bottom 12a and the floor F.

Spaced from and above the bottom surface 30 is a perforated or porous plate 32 supported by a shoulder 30h on each of the sidewalls 30b, 30c, 30d and 30e. Alternatively, support or spacer blocks could be provided instead of the shoulders 30h to support the porous plate 32. The porous plate 32 is preferably, fixed to the inner container 30 as by welding or bolting it in any suitable manner thereto and made of non-magnetic material. Plate 32 separates the container 30 into a lower fluid chamber 30j and an upper chamber 30k and has a plurality of passages 32a interconnecting the upper and lower chambers. As shown, the opposite sidewalls 30d and 30e extend between the sidewalls 12b and 12c of the outer container 12 and contained between them are the N and S poles of the laminated core or yoke 22. Long non-magnetic bolts or rods 38 threaded at opposite ends extend through holes in the N and S poles of the laminated yoke 22, the sidewalls 30d and 30e of the inner container 30, non-magnetic spacers 40, and the sidewalls 12d and 12e. Nuts 42 are threaded onto the ends of the bolts 38 which together clamp the laminated yoke 22, containers 12 and 30, and the spacers 40 together into a unitary structure.

Obviously, the preferred structure can be modified. For example, the inner container 30 could be eliminated and the porous plate 32 could be extended to and be fixed to the N and S poles and to the sidewalls 12d and 12e of the outer container 12. Thereby the cavity above the coil of wire 24 and between the N and S poles of the U-shaped yoke 22 would be separated by the porous plate 32 into similar lower and upper chambers 30j and 30k.

In the upper chamber 30k and resting on the porous plate 32 is a fluidizable bed of ferromagnetic particles 46. The bed can be composed of granular iron or ferrite particles of any shape. However, the particles 46 are preferably of uniform size, spherical in shape, and made of material characterized by a high magnetic permeability and low magnetic resistivity. A spheroidal transformer iron is a good material from which the spherical shaped particles 46 can be made. Making the particles of uniform size and spherical in shape prevents segregation from taking place and provides spaces of uniform size and volume between the particles.

Means are provided for fluidizing the bed of particles 46 within the inner container 30 and simultaneously expelling therefrom foreign matter, such as, dirt, swarf, and metal particles. As a result a workpiece, such as, the casting C, can be more easily re-oriented or partially embedded in a clean mobile bed of de-magnetized particles 46. The fluidizing means comprises a fluid conduit or pipe 50 having an inlet end 50a connected to the chamber 30j, in any suitable manner, such as, by threading it into a threaded hole 30l in the sidewall 30e below the porous plate 32. The pipe conduit 50 extends from the sidewall 30e through an opening in the sidewall 12e of the outer container 12, to the outlet side of a conventional solenoid operated fluid control valve V. Such a solenoid operated fluid control valve V is commercially available from many sources, one of which is the Automatic Switch Co., New York, N. Y. who make and sell valves known by the tradename "ASCO".

Upon energizing the solenoid of the control valve V, fluid under pressure can pass through valve V, pipe 50, into the lower fluid chamber 30j, through the passages 32a in the porous plate, into the upper chamber 30k, and through the bed of mobile particles 46 therein.

Connected to the inlet side of the solenoid operated fluid control valve V is a conduit or pipe 52 connected to the outlet side of a conventional adjustable diaphragm type constant pressure regulating valve PR. The inlet side of the regulating valve PR is connected to another conduit or pipe 54 connected to the outlet side of a conventional adjustable volume control and shut off valve VS. A fluid supply pipe 56 is connected to the inlet side of the valve VS and to a source of fluid under pressure. It is obvious that by manipulating the adjustable valve VS, the volume of fluid passing through the valve can be varied or completely shut off. Also, it is evident that the pressure of the fluid can be regulated by adjusting the valve PR. Therefore, it is possible for the operator to adjust the valves PR and VS to admit fluid into the chamber 30j of sufficient volume and pressure to fluidize the bed of particles 46.

The fluidizing medium can be of a variety of fluids, but is preferably air since most factories, and foundries has a sufficient source of compressed air to which the supply pipe 56 can be connected. The pressure and volume of the air passing through the bed of particles should be sufficient to just separate the spherical particles 46 from each other and suspend each particle 46 within the upper chamber 30k. Friction between the particles and the particles and the inner container 30 is thereby greatly reduced so that a casting or other workpiece can be repositioned, reoriented or partially embedded with little effort on the part of the operator. An excess of pressure and volume of air would tend to expel the particles 46 from the upper chamber 30k, especially when a workpiece is being imbedded. The workpiece reduces the volume of air space in the chamber 30k and thus causes the same volume of air to exert more pressure on the particles around the imbedded portion of the casting C. As a result, the particles are moved further apart in order to provide sufficient air space to accommodate the original volume of air supplied without increasing its velocity through the bed.

Each time the bed of particles 46 is fluidized, the air passing through the bed expels foreign matter therefrom which would otherwise accumulate. Allowing such materials, as the grinding swarf, dirt, and particles of the casting cut off by cutting tool to accumulate would eventually cut off the flow of air prevent fluidization of the bed, and reduce the strength of the magnetic field.

Control means are provided and operable in one position for de-energizing the solenoid operator control valve V and energizing the magnetic chuck 10 so that a magnetic field will extend through the chamber 30k between the N and S poles, and to defluidize and immobilize the bed of particles 26. The control means is operable also in another position to energize the solenoid valve V, de-energize the magnetic chuck, and to fluidize and mobilize the bed of particles 26. The control means comprises an electrical conduit 60 having conductors connected at one end to the opposite ends of the coil of wire 24 and extending out through openings in the support strip 26 and the sidewall 12b to a receptacle or switch box 62. The switch box 62 has fixed within it a pair of conventional switches S1 and S2. Switch S1 is a single pole main or disconnect switch connected into the hot line of a source of electricity and for making and breaking a main electrical circuit to the controls of the magnetic chuck 10. One side or terminal of the switch is connected to a hot line or conductor L1 of an electrical conduit 64. The other side or terminal of the switch S1 is connected to an end of another hot line or conductor L1, within the switch box 62, connected at its opposite end to the hot terminal of the switch S2. The switch S2 is thereby connected into the hot line L1 in series with the switch S1. Switch S2 is a single pole double throw selector switch having one terminal connected to the hot line or conductor L1 of an electrical conduit 66 connected to the coil SC of the solenoid operated fluid control valve V. The other terminal of the selector switch S2 is connected to one end of the hot line or conductor L1 of the electrical conduit 60 connected to the coil of wire 24. The neutral lines or ground conductors L2 of each of the electrical conduits 60, 64, and 66 are connected together within the switch box 62 and to the source of electrical energy. If desired, a conventional adjustable rheostat or varistat can be connected into the line L1 of the conduit 60 and adjusted to vary the amount of current passing through the coil of wire 24, the strength of the magnetic field, and hence the holding power of the electro magnetic chuck 10.

OPERATION

It can be seen from the above description that an operator can preadjust the magnetic chuck 10 of the invention for a particular casting or a group of substantially identical castings to be worked upon by first placing the switch S2 in the position which allows fluidization, cleaning, and mobilization of the bed of particles 26. The casting to be worked is then positioned, partially imbedded in and supported by the loose, demagnetized, and not as yet fluidized bed of particles 26. Main switch S1 is closed to energize the coil SC and to open the solenoid operated fluid control valve V. Thereafter, the volume control and shut off valve is slowly opened and adjusted to a position where the particles 26 are separated, held in suspension, and not expelled from the upper chamber 30k. Also, it may be necessary to readjust the pressure regulating valve PR to suit. Now any number of identical castings or castings having portions of substantially the same volume which must be imbedded to properly hold the castings can be easily imbedded in the fluidized bed without readjusting the valves VS and PR.

A casting can now be rigidly held by moving the selector switch S2 to the other position which de-energizes the coil SC, closes the solenoid operated valve V, defluidizes the bed of particles, energizes the coil 24, providing a magnetic field and which magnetizes and immobilizes the bed of ferromagnetic particles into a rigid mass about the casting C. Thus, the casting C is rigidly held without any further effort on the part of the operator and the upper exposed portions thereof worked upon by the power fed cutting tool such as the grinding wheel W of the pressurized snagging grinder G. The metal removal rate is thereby increased and costs lowered since the magnetic chuck 10 is able to hold odd shaped workpieces rigidly against the greater pressures exerted by the faster cutting and more powerfully fed cutting tools available.

When a casting needs to be reoriented or removed switch S2 is moved to the opposite position whereby coil 24 is de-energized, and the bed of particles demagnetized; the coil SC energized and the bed is again fluidized and simultaneously cleaned of foreign matter expelled by the air passing through. The casting is then easily reoriented, or removed and easily replaced by another after which the switch S2 is moved again actuated to repeat the cycle and clamp the casting in position.

Although an electro magnet 20 has been disclosed it is obvious that one or more U-shaped permanent magnets could be used to make a magnetic chuck 10 with suitable holding power for some applications. However, the strength of the permanent magnetic field which tends to hold the particles 46 together and immobilized, must be overcome by increasing the volume and pressure of the fluidizing medium sufficiently to separate and fluidize the bed of particles into which the workpiece is easily partially imbedded.

It is to be understood that many modifications may be made of the embodiment of the invention disclosed hereinabove without departing from the spirit of the invention and which are within the scope of the appended claims.

I claim:

1. A magnetic chuck for holding workpieces of various shapes comprising:

means including poles of opposite polarity for producing a magnetic field between the poles of opposite polarity;

means for containing a bed of ferromagnetic particles in the magnetic field between the poles of opposite polarity;

a bed of ferromagnetic particles contained within the containing means and the magnetic field and adapted to be immobilized into a rigid mass by the magnetic field induced between the poles of opposite polarity and into which the workpieces are partially imbedded and held by the immobilized rigid mass, and means operable for conveying a fluid under pressure into and through the bed of ferromagnetic particles, for cleaning, and fluidizing the bed of ferromagnetic particles.

whereby undesirable foreign matter is expelled from the bed of ferromagnetic particles to prevent it from substantially changing the fluid flow and the strength of the magnetic field, and workpieces of various shapes are easily partially imbedded in the mobilized fluidized bed of ferromagnetic particles and rigidly held by the immobilized bed of ferromagnetic particles.

2. A magnetic chuck for holding workpieces of various shapes according to claim 1 wherein the means for producing a magnetic field comprises:

a U-shaped magnet having,
   a chamber in between the poles of opposite polarity containing the bed of ferromagnetic particles.

3. A magnetic chuck for holding workpieces of various shapes according to claim 2 further comprising:

a perforated plate supported within the chamber of the U-shaped magnet and separating the chamber into an upper chamber containing the ferromagnetic particles above the perforated plate and a lower chamber below the perforated plate through which the fluid under pressure is conveyed into the upper chamber and through the bed of ferromagnetic particles, the perforated plate having passages smaller than the smallest dimension of the ferromagnetic particles and interconnecting the upper and lower chambers.

4. A magnetic chuck for holding workpieces of various shapes according to claim 1 wherein the means for containing the ferromagnetic particles comprises:

a container, including a chamber for the ferromagnetic particles, situated within the magnetic field between the poles of opposite polarity.

5. A magnetic chuck for holding workpieces of various shapes according to claim 4 wherein the container for the ferromagnetic particles situated within the magnetic field between the poles of opposite polarity comprises:

a bottom wall
   an open top side opposite the bottom wall
   a sidewall extending peripherally around the container and upwardly from the bottom wall to the open top side
   a perforated wall, within the sidewall between bottom wall and the open top side,
   an upper chamber above the perforated wall and within which is situated the bed of ferromagnetic particles upon the perforated wall;
   a lower chamber below the perforated wall and into which the fluid under pressure is conveyed before passing through the perforated wall and the bed of ferromagnetic particles; and a plurality of passages in the perforated wall interconnecting the upper and lower chambers.

6. A magnetic chuck for holding workpieces of various shapes according to claim 5 wherein the means for conveying the fluid under pressure through the bed of ferromagnetic particles comprises:

a conduit connected to the container and adapted to interconnect the lower chamber to a source of the fluid under pressure, and means, for stopping and starting the fluid under pressure flowing through the conduit, the chamber and the bed of ferromagnetic particles.

7. A magnetic chuck for holding workpieces of various shapes according to claim 6 wherein the means for producing a magnetic field comprises:

an electro magnet; and means including an electrical circuit for energizing and de-energizing the electro magnet.

8. A magnetic chuck for holding workpieces of various shapes according to claim 7 wherein the means for stopping and starting the fluid under pressure flowing comprises:

a solenoid operated valve connected into the conduit between the container and the source of the fluid under pressure; and wherein the means for energizing and de-energizing the electro magnet comprises:

a selector switch connected to a source of electrical current in the electrical circuit, the selector switch operable upon moving it to one position to de-energize the electro magnet, remove the magnetic field, mobilize the bed of magnetic particles, energize the solenoid operated valve to allow the fluid to flow through to clean and fluidize the bed of ferromagnetic particles, and the selector switch operable when moved to another position to de-energize the solenoid operated valve, to cut off the fluid flow which defluidizes the bed of ferromagnetic particles, and energizing the electro magnet, to produce the magnetic field and immobilize the bed of ferromagnetic particles.

9. A magnetic chuck for holding workpieces of various shapes according to claim 8 further comprising:

an adjustable constant volume control valve connected into the conduit between the container and the source of the fluid under pressure.

10. A magnetic chuck for holding a workpiece of various shapes according to claim 9 further comprising:

an adjustable constant pressure control valve connected into the conduit between the container and the source of the fluid under pressure.

11. A magnetic chuck for holding workpieces of various shapes according to claim 10 further comprising:

an outer container within which are situated the electro magnet and the container containing the bed of ferromagnetic particles between the poles of opposite polarity.

12. A magnetic chuck for holding workpieces of various shapes according to claim 11 wherein the ferromagnetic particles are of substantially spherical shape and of substantially a uniform size larger than the passages in the perforated wall.

13. A magnetic chuck for holding workpieces of various shapes according to claim 12 wherein the electro magnet comprises:

a U-shaped yoke; and wherein the containers are non-magnetic.

* * * * *